United States Patent

[11] 3,603,575

| [72] | Inventors | David F. Arlasky;<br>Robert W. Chapman, both of Chicago, Ill. |
|---|---|---|
| [21] | Appl. No. | 841,189 |
| [22] | Filed | July 7, 1969 |
| [45] | Patented | Sept. 7, 1971 |
| [73] | Assignee | Chapman Performance Products, Inc.<br>Chicago, Ill. |

[54] ADJUSTABLE VEHICLE-STABILIZING UNIT
6 Claims, 5 Drawing Figs.

| [52] | U.S. Cl. | 267/34 |
|---|---|---|
| [51] | Int. Cl. | F16f 5/00 |
| [50] | Field of Search | 267/34, 8 |

[56] References Cited
UNITED STATES PATENTS

| 2,756,045 | 7/1956 | Savory | 267/8 |
|---|---|---|---|
| 3,096,084 | 7/1963 | Osterhoudt | 267/8 |

Primary Examiner—James B. Marbert
Attorney—Edward C. Threedy

ABSTRACT: A combined coil spring and shock absorber unit for vehicle suspension wherein the compression of the coil spring may be adjustable relative to the shock absorber to properly level the suspended vehicle.

PATENTED SEP 7 1971

3,603,575

INVENTORS.
DAVID F. ARLASKY
ROBERT W. CHAPMAN
BY Edward C. Threedy
THEIR ATTORNEY.

ADJUSTABLE VEHICLE-STABILIZING UNIT

SUMMARY OF THE INVENTION

A vehicle-stabilizing and suspension unit including a hydraulic shock absorber, the body of which is contained within a housing having a portion of its outer wall surface externally threaded. A coil spring encircles the housing as well as the telescopical piston rod of the shock absorber between a restraining disc fixedly connected to one end of the piston rod and an adjusting ring that is threadable axially over the outer wall of the housing to vary the compression of the coil spring without interfering with the mechanical function of the shock absorber.

GENERAL DESCRIPTION

The invention will be best understood by reference to the accompanying drawing showing a preferred embodiment of the invention and in which.

Figure 1:
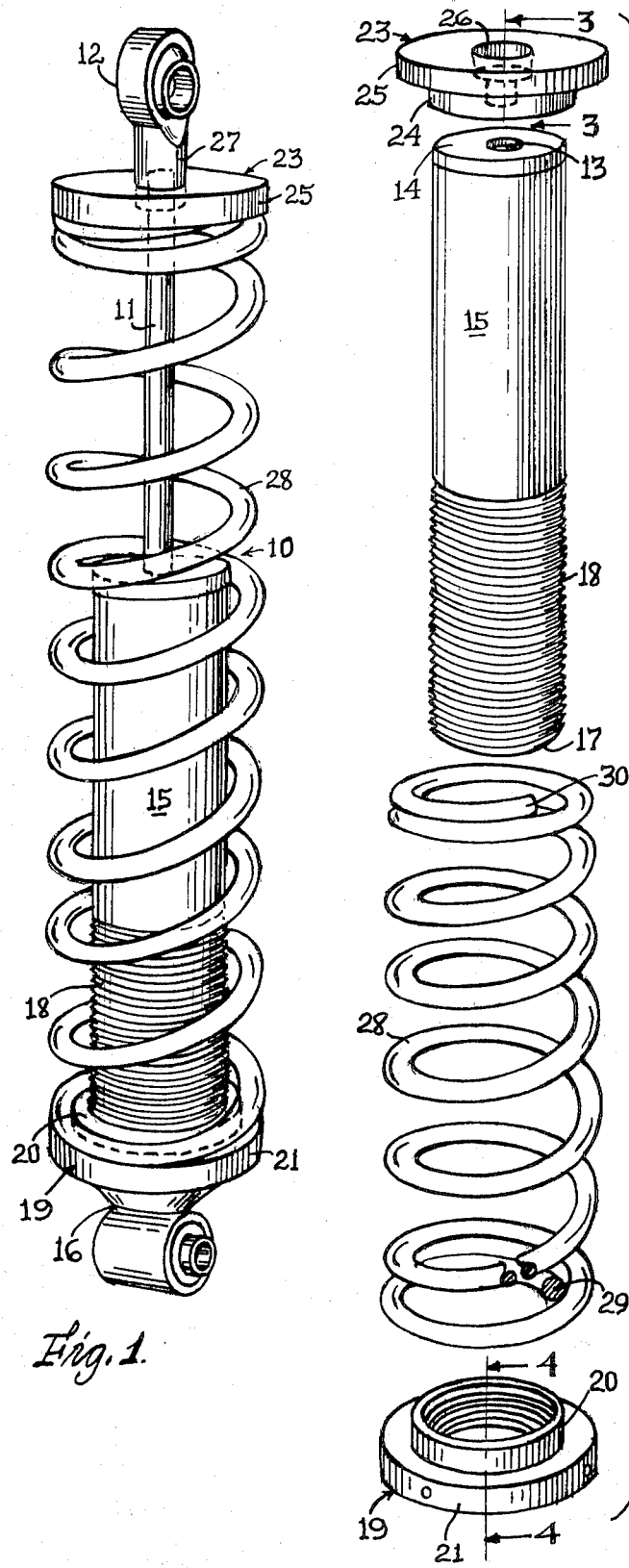
FIG. 1 is a perspective view of the stabilizing and suspension unit.
Figure 5:
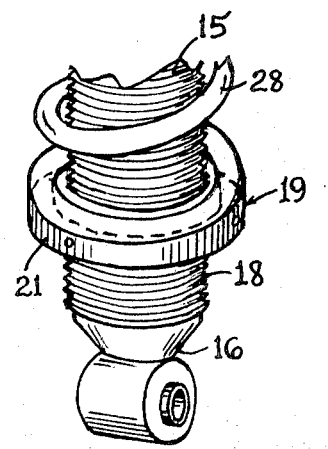
FIG. 5 is a fragmentary perspective view showing the adjusting ring in an adjusted position.

Referring to the drawings and particularly to FIG. 1 thereof, a vehicle-stabilizing and suspension unit including a shock absorber and coil spring is shown in assembled relationship. The stabilizing and suspension unit 10 includes a hydraulic shock absorber (not shown) of any standard construction, and as such its structure makes up no part of the present invention other than in its functional relationship to the entire unit. The shock absorber includes an axially extendable piston rod 11 which at its distal end provides an aircraft heim joint 12. The piston rod 11 extends out of a central opening 13 formed in a removable cap 14 that is threaded upon one end of a tubular housing 15. The housing 15 is of a length slightly less than the longitudinal length of the shock absorber so that the tapered neck and mounting sleeve 16 thereof projects out of the opposite end 17 of the housing 15, as seen in FIGS. 1 and 5.

The lower end of the housing 15 has its outer wall surface threaded as at 18, and threadably receives a ring 19 which consists of a circular internally threaded sleeve 20 which terminates into an enlarged collar 21.

Figure 3:
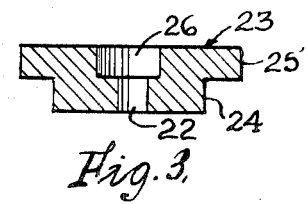
FIG. 3 is a detailed sectional view of the restraining disc taken on line 3—3 of FIG. 2.
Figure 4:
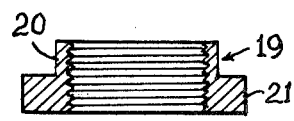
FIG. 4 is a detailed sectional view of the adjusting ring taken on line 4—4 of FIG. 2.
Figure 2:
FIG. 2 is a perspective view of certain parts of the unit in an exploded relationship.

The distal end of the piston rod 11 projects through a center bore 22 formed in a restraining disc 23. The restraining disc 23 includes a circular hub 24 having a diameter equal to the sleeve 20 of the adjusting ring 19. The hub 24 includes an enlarged collar 25 having a diameter equal to the collar 21 of the adjusting ring 19. A counterbore 26 is formed in the collar 24 in communication with the bore 22 formed in the hub 24 of the restraining disc 23 as shown in FIG. 3. The threaded distal end of the piston rod 11 is freely projected through the bore 22 and is threaded into the base 27 of the joint 12 which projects into the counterbore 26. By this arrangement the restraining disc 23 is connected in a fixed relation to the joint 12.

Freely coiled about the housing 15 is a spring 28, one end 29 of which encircles the sleeve 20 and bears against the collar 21 of the adjusting ring 19. The opposite end of the spring 28 encircles the hub 24 and bears against the collar 25 of the restraining disc 23.

The suspension unit, as hereinbefore described, supports the vehicle body and frame upon the wheel supporting structure of the vehicle. Due to continuous use the springs may weaken or the shock absorber may become worn, permitting the suspension to sag. The heretofore described stabilizing and suspension unit is of the universal type and requires no extensive or complicated mounting hardware, and as required, the compression of the spring 28 may be increased or decreased by axial movement of the adjusting ring 19 over the body 15 by threading the same over the external threading portion 18 thereof. This adjustability of the suspension unit of this invention permits the vehicle to be leveled or altered as required.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

What we claim is:

1. An adjustable suspension device including a hydraulic shock absorber having a body unit and an extendable piston rod with both the body unit and piston rod providing mounting hardware therefor wherein the improvement comprises:
    a. a hollow cylindrical housing for the cylinder of the shock absorber unit, with the housing having a portion of its outer surface threaded,
    b. restraining means fixedly carried by the distal end of the piston rod and movable therewith relative to said housing,
    c. an adjusting means threaded upon the threaded portion of said housing and movable axially thereover, and
    d. a coil spring embracing said housing and the piston rod and positioned between said restraining means and said adjusting means whereby its compression is determined by the adjustable axial movement of said adjusting means over said housing.

2. An adjustable suspension device as defined by claim 1 wherein said restraining means comprises a circular disc against which one end of the coil spring bears, said disc providing means whereby it is fixedly connected to the distal end of the piston rod of the shock absorber.

3. An adjustable suspension device of claim 1 further defined by having a portion of said housing externally threaded, and with said adjusting means comprising an internally threaded ring positionable axially of said housing with said ring compressing said coil spring against said fixed restraining means.

4. The adjustable suspension device of claim 3 wherein said restraining means comprises a circular disc against which one end of the coil spring bears, said disc providing means whereby it is fixedly connected to the distal end of the piston rod of the shock absorber.

5. The adjustable suspension device of claim 2 wherein said restraining disc provides a hub about which one end of said spring is coiled, and an enlarged collar against which said one end of said coil spring bears when it is compressed by said adjusting means.

6. The adjustable suspension device of claim 4 wherein said ring provides an enlarged collar upon which sits the opposite end of the coil spring, and which cooperates with said enlarged collar provided by said restraining disc to compress said coil spring therebetween as said disc is threaded axially over said housing.